United States Patent
Izukura

(10) Patent No.: US 10,096,036 B2
(45) Date of Patent: Oct. 9, 2018

(54) OPTIMAL DESIGN ASSISTANCE DEVICE, METHOD, AND RECORDING MEDIUM

(71) Applicant: NEC Corporation, Minato-ku, Tokyo (JP)

(72) Inventor: Sayaka Izukura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 544 days.

(21) Appl. No.: 14/650,641

(22) PCT Filed: Dec. 16, 2013

(86) PCT No.: PCT/JP2013/007373
§ 371 (c)(1),
(2) Date: Jun. 9, 2015

(87) PCT Pub. No.: WO2014/097599
PCT Pub. Date: Jun. 26, 2014

(65) Prior Publication Data
US 2015/0371249 A1    Dec. 24, 2015

(30) Foreign Application Priority Data
Dec. 17, 2012    (JP) ................................ 2012-274429

(51) Int. Cl.
G06Q 30/02    (2012.01)
G06Q 50/10    (2012.01)

(52) U.S. Cl.
CPC ......... *G06Q 30/0206* (2013.01); *G06Q 50/10* (2013.01)

(58) Field of Classification Search
CPC ..................................................... G06Q 30/02
See application file for complete search history.

(56) References Cited

U.S. PATENT DOCUMENTS 6,611,867 B1 * 8/2003 Bowman-Amuah ........................ H04L 41/046 709/218
8,429,307 B1 * 4/2013 Faibish ................. G06F 3/0605 710/1

(Continued)

FOREIGN PATENT DOCUMENTS

| JP | 2004030292 A | 1/2004 |
|---|---|---|
| JP | 2006227952 A | 8/2006 |

(Continued)

OTHER PUBLICATIONS

International Search Report for PCT Application No. PCT/JP2013/007373, dated Mar. 4, 2014.

(Continued)

*Primary Examiner* — Kurtis Gills

(57) ABSTRACT

An optimal design assistance device which assists in design of system configuration with minimum price of a computer system, even it is the computer system which performs complicated processing, so that it can be accomplished in a short time and with high efficiency is provided.

The optimal design assistance device which assists in design of controllable design parameters of the computer system to which a plurality of Service Level Objects (SLOs) defining non-functional requirements are specified includes: a relaxation solution derivation unit which derives a relaxation solution evaluation value that is the minimum value of the price of the system configuration of the computer system which achieves a part of the SLOs among a plurality of the SLOs; and a search unit which searches for a parameter set of the design parameter by which all the plurality of SLOs are achieved and the price of the system configuration is made lowest by using the relaxation solution evaluation value unit.

6 Claims, 7 Drawing Sheets

(56) References Cited

U.S. PATENT DOCUMENTS

| | | | | |
|---|---|---|---|---|
| 2007/0011052 A1* | 1/2007 | Liu | ............... | G06Q 20/201 |
| | | | | 705/20 |
| 2007/0129992 A1* | 6/2007 | Kasper | ............... | G06Q 10/06 |
| | | | | 705/7.31 |
| 2009/0177507 A1* | 7/2009 | Breitgand | ............... | G06Q 10/0639 |
| | | | | 705/7.38 |
| 2011/0185064 A1* | 7/2011 | Head | ............... | G06F 9/5077 |
| | | | | 709/226 |

FOREIGN PATENT DOCUMENTS

| | | | |
|---|---|---|---|
| JP | 2006252162 A | 9/2006 | |
| JP | 2010128835 A | 6/2010 | |
| WO | 2008114355 A1 | 9/2008 | |

OTHER PUBLICATIONS

English Translation of written opinion for PCT Application No. PCT/JP2013/007373.

* cited by examiner

Fig.3

|  | PRODUCT 71 | THE NUMBER OF CORES 72 | BENCHMARK VALUE 73 | PRICE 74 |
|---|---|---|---|---|
| WEB /AP SERVER | x0 | 1 | 1 | 100 |
| | x1 | 2 | 1.5 | 120 |
| | x2 | 2 | 2.2 | 150 |
| | x3 | 4 | 3 | 250 |
| | x4 | 4 | 2.5 | 200 |
| | x5 | 8 | 3.1 | 300 |
| DB SERVER | y0 | 1 | 1 | 150 |
| | y1 | 2 | 2 | 200 |
| | y2 | 4 | 3 | 180 |
| | y3 | 4 | 2.5 | 230 |

OPTIMAL DESIGN ASSISTANCE DEVICE, METHOD, AND RECORDING MEDIUM

This application is a National Stage Entry of PCT/JP2013/007373 filed on Dec. 16, 2013, which claims priority from Japanese Patent Application 2012-274429 filed on Dec. 17, 2012, the contents of all of which are incorporated herein by reference, in their entirety.

TECHNICAL FIELD

The present invention relates to an optimal design assistance device which assists in design of controllable design parameters of a computer system, a method, and a program.

BACKGROUND ART

In order to prevent a perception gap in service quality of a computer system between a customer and a provider, when the computer system is developed, a target value (SLO: Service Level Object) of service quality to non-functional requirements such as performance, availability, and the like is usually set in advance between the customer and the provider.

Performance is one of the typical non-functional requirements. For example, in the SLO to define the performance, it is defined that the maximum throughput indicating the processing ability of the system, the turnaround time indicating a time span between a start time and an end time of a predetermined process, and the usage rate of various resources such as a CPU (Central Processing Unit), a thread, and the like should be within a permissible range.

Usually, in order to achieve a design (capacity planning) of the system configuration in which such SLO is taken into consideration, knowledge based on the experience of the expert in the technical field concerned or the like is used. The system configuration which satisfies the condition of the required performance and availability is selected. Namely, a combination of the controllable design parameters is selected.

However, because a lot of the design parameters to be determined exist, it takes a lot of trouble to determine the appropriate combination without using a computer. Further, there are a plurality of configurations which can achieve the SLO and guarantee the service quality. However, it takes much time and manpower to select the most suitable combination by which the price can be made lowest among the plurality of configurations.

Therefore, it is required to efficiently derive the combination of the design parameters by which all the SLOs are achieved and the price is made lowest by automating the process to determine such system configuration.

Here, such problem can be formulated as the so-called combination optimization problem which determines a value of each control variable so that the given constraint condition is satisfied and the highest evaluation is obtained when a predetermined evaluation standard is used.

As a publicly-known technology to solve this kind of optimization problem, in patent literature 1 shown below, the system configuration is represented by a plurality of parameters (a parameter set). It shows a technology in which the system configuration whose price is lowest is automatically derived under a predetermined constraint condition related to a response time. More specifically, it shows the technology in which the response time of the system is predicted on the basis of the queuing theory and the optimal point satisfying the constraint condition is obtained by successive approximation using Lagrange's method of undetermined multipliers and Newton's method.

Further, patent literature 2 shows a technology below. An increment of a load is calculated when a multiplicity of processing is increased on the basis of load information of resources such as a CPU and the like that is collected for each business application executed on a server. Then, the most suitable multiplicity of the processing is determined so that an amount of the load to all the resources is equal to or lower than an upper limit value set in advance.

Further, patent literature 3 shows a technology below. A resource usage amount is allocated to each component of a development target system in a range of a determined allocation ratio, system performance, when a plurality of transactions are simultaneously executed, is predicted. The resource usage amount is repeatedly reallocated when a prediction result shows that the required performance is not met until it is met, and whereby, the resource usage amount of each component that is required for meeting the performance requirement is explored.

CITATION LIST

Patent Literature

[PTL 1] Japanese Patent Application Laid-Open No. 2004-30292
[PTL 2] Japanese Patent Application Laid-Open No. 2006-252162
[PTL 3] Japanese Patent Application Laid-Open No. 2010-128835

SUMMARY OF INVENTION

Technical Problem

However, a predictive value of the response time of the system which performs complicated processing including parallel processing, branch and synchronization processing, and the like cannot be represented by a closed equation (mathematical expression) by the technology proposed in patent literature 1. Further, it is possible to obtain an approximate expression of the response time or the like by simulation for simulating the state of processing, measurement using an actual equipment, or the like. However, because the simulation or the actual measurement has to be performed under various conditions, it takes a lot of time. In the contrary case, when the simulation or the actual measurement is performed under only a limited small number of conditions, a large error occurs and whereby, the evaluation of non-functional requirement and the capacity planning cannot be correctly performed.

Further, in the technology proposed in patent literature 2, only the resource usage rate which can be obtained by a simple proportional calculation is used as the SLO and the response time or the like that cannot be correctly predicted is not used as the SLO.

Further, in the technology proposed in patent literature 3, the performance prediction is performed to various system configurations repeatedly. Namely, the so-called cut-and-try method is used. Therefore, this is an inefficient method of finding the configuration that meets customer requirements.

The present invention is made in view of the above mentioned situation and the object of the present invention is to provide an optimal design assistance device which assists in design of system configuration with minimum price of the computer system, even it is the computer system which performs complicated processing, so that it can be accomplished in a short time and with high efficiency and a program.

Solution to Problem

In order to solve the above-mentioned problem, an optimal design assistance device of the present invention is an optimal design assistance device which assists in design of controllable design parameters of a computer system to which a plurality of Service Level Objects (SLOs) defining non-functional requirements are specified. It includes: relaxation solution derivation means which derive a relaxation solution evaluation value that is the minimum value of a price of a system configuration of the computer system which achieves a part of the SLOs among a plurality of the SLOs; and search means which search for a parameter set of the design parameter by which all the plurality of SLOs are achieved and the price of the system configuration is made lowest by using the relaxation solution evaluation value.

A program of the present invention causes an optimal design assistance device, which assists in design of controllable design parameters of a computer system to which a plurality of Service Level Objects (SLOs) defining non-functional requirements are specified, to realize: a step in which a relaxation solution evaluation value that is the minimum value of a price of a system configuration of the computer system which achieves a part of the SLOs among a plurality of the SLOs is derived; and a step in which a parameter by which all the plurality of SLOs are achieved and the price of the system configuration is made lowest is searched for by using the relaxation solution evaluation value.

Further, a method for: deriving a relaxation solution evaluation value that is the minimum value of a price of a system configuration of a computer system which achieves a part of Service Level Objects (SLOs) among a plurality of the SLOs; and searching for a parameter by which all the plurality of SLOs are achieved and the price of the system configuration is made lowest by using the relaxation solution evaluation value in an optimal design assistance device which assists in design of controllable design parameters of a computer system to which a plurality of the SLOs defining non-functional requirements are specified.

Advantageous Effects of Invention

The present invention can assist in design of an optimal system configuration with minimum price of a computer system, even it is the computer system which performs complicated processing, so that it can be accomplished in a short time and with high efficiency. In more detail, the system configuration by which the SLO can be achieved and the price can be made lowest without representing the predictive value of the service level such as the response time or the like as a closed equation can be automatically determined. Further, the capacity planning which can be applied to the above-mentioned system which performs complicated processing can be automatically performed.

BRIEF DESCRIPTION OF DRAWINGS

FIG. 3 is a figure showing an example of product information including a value which influences a service level and price information that are defined for each product that can be used for each server of a system model shown in FIG. 2.

DESCRIPTION OF EMBODIMENTS

Figure 1:
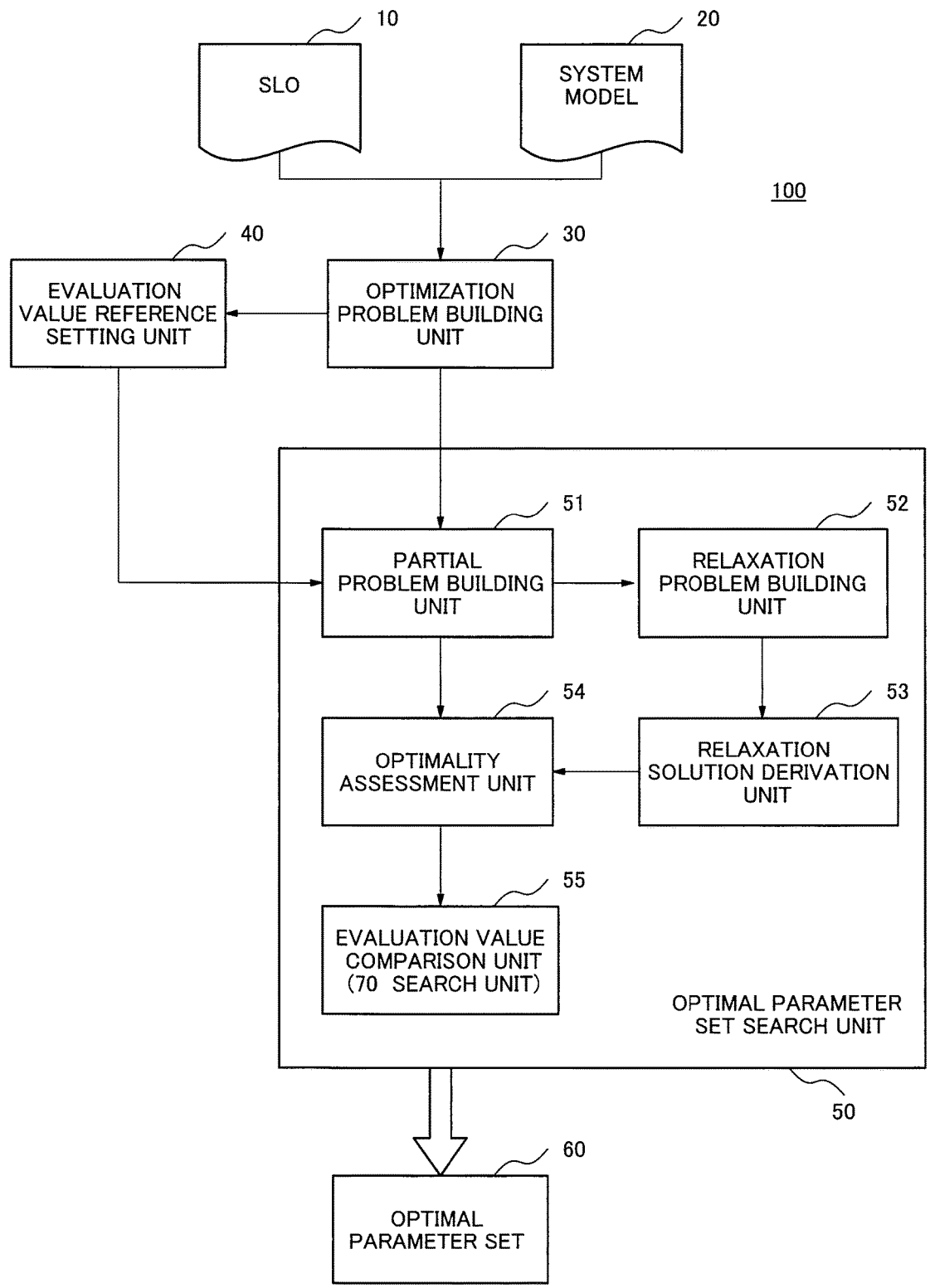
FIG. 1 is a block diagram showing a configuration of an optimal design assistance device according to a first exemplary embodiment of the present invention.

Each exemplary embodiment of the present invention will be described below with reference to the drawing.

First Exemplary Embodiment

FIG. 1 is a block diagram showing a configuration of an optimal design assistance device 100 according to a first exemplary embodiment. The optimal design assistance device 100 is a device which assists in design of controllable design parameters of a computer system to which a plurality of SLOs defining non-functional requirements are specified. Specifically, this optimal design assistance device 100 may be realized by an information processing device such as a computer or the like which operates in accordance with a program that is stored in a memory and executed by a processor. The optimal design assistance device 100 may be provided in the above-mentioned computer system or it may be provided in an information processing device other than the above-mentioned computer system. Further, the optimal design assistance device 100 may be a dedicated device composed of a logic circuit which functions as each unit described below. Here, the each unit is an evaluation value reference setting unit 40, an optimization problem building unit 30, an optimal parameter set search unit 50, a partial problem building unit 51, a relaxation problem building unit 52, a relaxation solution derivation unit 53, an optimality assessment unit 54, an evaluation value comparison unit 55, or the like.

As shown in FIG. 1, the optimal design assistance device 100 includes the optimization problem building unit 30 and the evaluation value reference setting unit 40. The optimization problem building unit 30 formulates an optimization problem for determining an optimal system configuration from a SLO 10 and a system model 20. The evaluation value reference setting unit 40 sets a reference value to an evaluation value of an objective function in the optimization problem. The optimal design assistance device 100 further includes the optimal parameter set search unit (parameter set search unit) 50 which solves the above-mentioned optimization problem and searches for an optimal parameter set 60 by which the optimal system configuration can be obtained. Further, the optimal parameter set search unit 50 includes the partial problem building unit 51, the relaxation problem building unit 52, the relaxation solution derivation unit 53, the optimality assessment unit 54, and the evaluation value comparison unit 55 (it is also called a search unit 70).

As described above, the SLO 10 is a target value of the service level to the non-functional requirements such as performance, availability, and the like. The target value is specified to the computer system that is a target of design by the customer. Specifically, for example, the target value to performance such as a response time of the computer system, a usage rate of various resources, or the like and the target value to availability such as a failure rate of the system, a release time, or the like are specified.

The system model 20 is a model for representing design information of the computer system described in a form that can be processed by a machine. This model includes various design parameters such as the number of servers, the number of CPU cores, the number of threads, and the like that influence a connection state of a system component including hardware, software, and the like and a service level to the non-functional requirements of the system. This model further includes a range of values taken by the design parameter and information indicating the controllable design parameters.

The SLO 10 and the system model 20 are given to the optimal design assistance device 100 from the outside or stored in a storage device provided in the optimal design assistance device 100.

Figure 2:
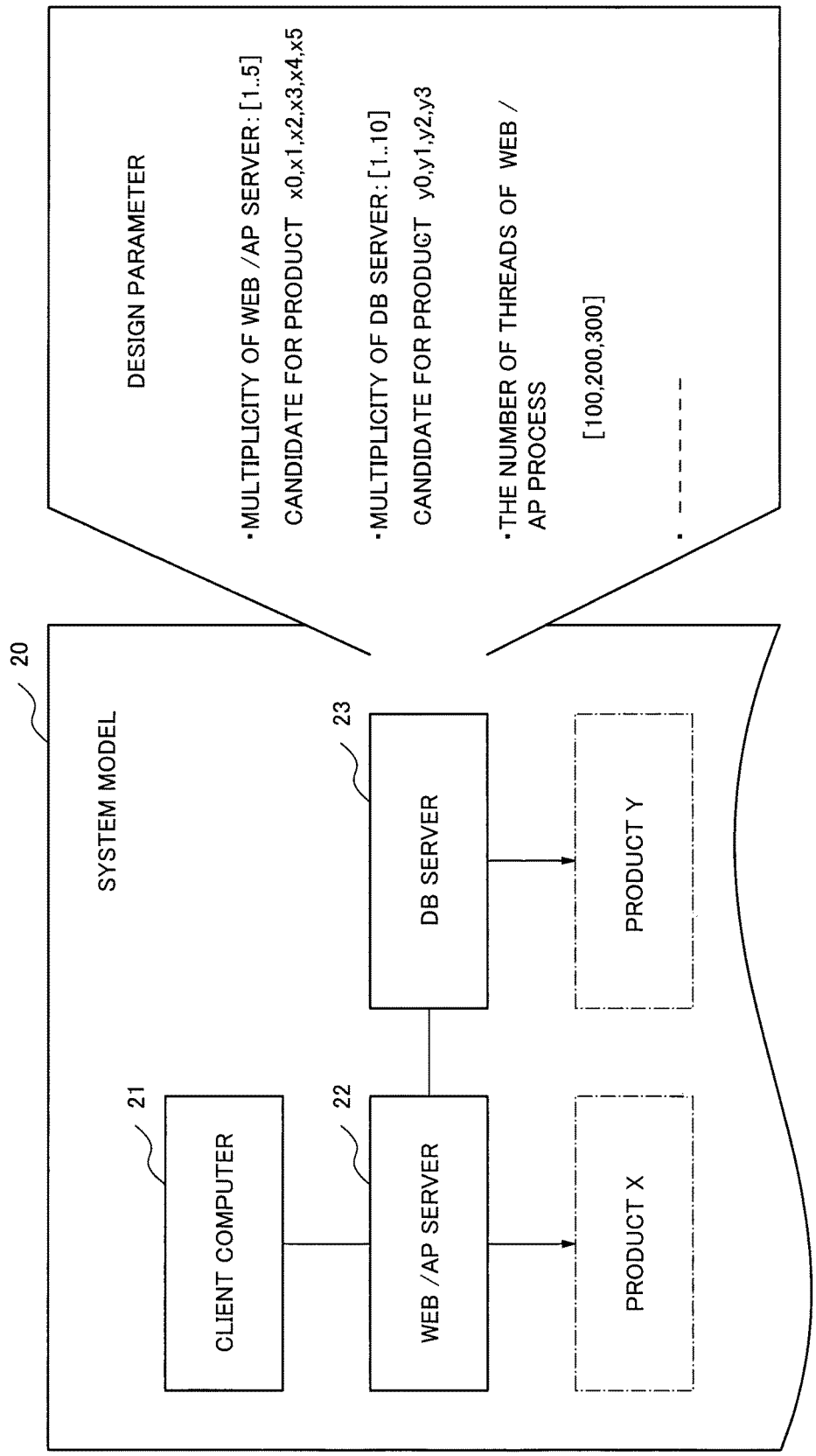
FIG. 2 is a figure showing an example of a system model in an optimal design assistance device shown in FIG. 1.

FIG. 2 is a figure showing a specific example of the system model 20. In the system model 20, a client computer 21, a web/AP (Application) server 22, and a DB (Data Base) server 23 are connected in series via a network. For example, in the system model 20, it is described that one of the products x0 to x5 can be used for the web/AP server 22 and the number of the web/AP servers 22 that can be used is 1 to 5 and one of the products y0 to y3 can be used for the DB server 23 and the number of the DB servers 23 that can be used is 1 to 10. Namely, as the design parameter in this system model 20, the number (n1) of the web/AP servers 22, the number (n2) of the DB servers 23, and the identifiers (product indexes (i1,i2)) indicating the types of the products X and Y that are used are defined. These parameters can take the following values.

n1={1 to 5}, n2={1 to 10}, i1={x0 to x5}, and i2={y0 to y3}

In the system model 20, a price 74 of the product X (x0 to x5) and a price 74 of the product Y (y0 to y3) are defined in addition to specifications such as the number 72 of the CPU cores, benchmark values (a clock frequency and a memory capacity) 73, and the like. The price 74 is associated with a product index 71 of each of the product X (x0 to x5) and the product Y (y0 to y3) as shown in FIG. 3. Further, the specification is the design parameter which influences the service level of the computer system. Further, in the first exemplary embodiment, the data shown in FIG. 3 is called product information 7. Accordingly, the change of the product index of the server including the web/AP server 22 and the DB server 23 (hereinafter, referred to as the server) means that another product is used for the server concerned. Therefore, the values of the product information such as the specification, the price, and the like change according to the product index that is a target to be changed.

The optimization problem building unit 30 formulates a determination of the optimal system configuration based on the SLO 10 and the system model 20 as the optimization problem. Namely, the optimization problem building unit 30 formulates obtainment of a combination (optimal parameter set) of the values of the design parameters of the system model 20 so that the specified SLO is achieved and the price is minimized and formulating the combination is the optimization problem.

Specifically, the optimization problem building unit 30 formulates the combination optimization problem. In this optimization problem, the controllable design parameters described in the system model 20 are used as the control variable. In this optimization problem, a total price (cost) of the computer system is calculated on the basis of the price of each of the components (the products x0 to x5 and the products y0 to y3) described in the system model 20 under the constraint condition in which the specified SLO is achieved. The total price is used as the objective function.

For example, a case in which the system model 20 shown in FIG. 2 is used and the SLO 10 shown below is specified will be taken as an example.

(a) The CPU usage rates of all the servers are equal to or lower than 90%.

(b) The response time of the request is equal to or shorter than 0.5 seconds.

In this case, the optimization problem building unit 30 performs a formulation in which a configuration with minimum cost in which the evaluation values of the service levels (the CPU usage rate and the response time) of the computer system are equal to or smaller than 0.9 and 0.5, respectively is obtained. Namely, the optimization problem building unit 30 performs the formulation in which a configuration whose cost (ci1×n1+ci2×n2) is lowest is obtained, where n1 is the number of the web/AP servers 22, ci1 is a price of the product i1 to be used, n2 is the number of the DB servers 23, and ci2 is a price of the product i2 to be used.

The evaluation value reference setting unit 40 sets a lower limit of the evaluation value that can be taken as a solution of the combination optimization problem as a reference value to the evaluation value of the objective function in the optimization problem. For example, the evaluation value reference setting unit 40 sets an upper limit of the cost that is specified by a customer, the evaluation value of a feasible solution in the above-mentioned optimization problem that is obtained by any kind of method, or the like as the reference value.

The optimal parameter set search unit 50 searches for the parameter set of the design parameter by which all the plurality of specified SLOs are achieved and the price of the system configuration of the computer system is made lowest by using the minimum value of the price derived by the relaxation solution derivation unit 53. The partial problem building unit 51, the relaxation problem building unit 52, the relaxation solution derivation unit 53, the optimality assessment unit 54, and the evaluation value comparison unit 55 that are included in the optimal parameter set search unit 50 will be described below in turn.

The partial problem building unit 51 divides the above-mentioned combination optimization problem (hereinafter, also referred to as an original problem) into a plurality of partial problems. Specifically, the partial problem building unit 51 converts the combination optimization problem into a plurality of small-scale optimization problems by dividing the domain of definition of several control variables in the original problem to narrow a search range.

For example, in the optimization problem to the system model 20 shown in FIG. 2, the domain of definition of each control variable in the original problem is shown as follows. n1={1 to 5}, n2={1 to 10}, i1={x0 to x5}, and i2={y0 to y3}. Further, the partial problem building unit 51 divides the domain of definition of the control variable n2 into two: one is n1={1 to 5}, n2={1 to 5}, i1={x0 to x5}, and i2={y0 to y3} and the other is n1={1 to 5}, n2={6 to 10}, i1={x0 to x5}, and i2={y0 to y3}. The partial problem building unit 51 converts the original problem into the problem in which the optimal parameter sets included in two search areas: one is a case in which the number of the DB servers 23 is 1 to 5; the other is a case in which the number of the DB servers 23 is 6 to 10 are obtained.

The relaxation problem building unit 52 formulates a relaxation problem which can be simply solved by using the constraint condition that is more relaxed than those of the original problem and the partial problem. Specifically, the relaxation problem building unit 52 formulates a problem in which the optimal parameter set is obtained when only a part of the SLOs 10 to which it can be determined whether or not the SLO can be achieved at a high speed among the specified SLOs 10 is used as the constraint condition. For example, "it can be determined whether or not the SLO can be achieved at a high speed" means a case in which it can be determined by performing an analytical calculation (for example, calculation of four operations) by a predetermined number of times or a case in which it can be determined without performing a simulation.

For example, the simulation has to be performed in order to predict the response time among two SLOs 10 mentioned above. However, a CPU usage rate U of the server can be predicted by a simple equation (1) shown below, where n is the number of servers, N is the number of CPU cores mounted in the server, and SP is a benchmark value obtained by measuring performance per core of a server device.

$$U=(\lambda \times d)/(n \times N \times SP) \quad (1)$$

Here, in equation (1), $\lambda$ is a request arrival rate. d is a processing time per request and it is a fixed value when the request is a specific request.

Accordingly, in the relaxation problem, by taking into consideration only the constraint condition (equation (2) shown below) in which with respect to all the servers s, a value of a CPU usage rate Us is equal to or smaller than 0.9, the optimal parameter set by which the cost is made lowest may be determined.

$$Us=(\lambda s \times ds)/(ns \times Ns \times SPs)<0.9 \quad (2)$$

Here, $\lambda s$ is a request arrival rate of the server s, ds is a processing time per request of the server s, Ns is the number of CPU cores of the server s, and SP is a benchmark value of the server s.

For example, in the system model 20 shown in FIG. 2, the web/AP server 22 (server 1) and the DB server 23 (server 2) satisfy the following equations (3) and (4), respectively and a combination of n (natural number), N, and SP is determined so that the price is made lowest.

$$(\lambda \times d1)/(n1 \times N1 \times SP1)<0.9 \quad (3)$$

$$(\lambda \times d2)/(n2 \times N2 \times SP2)<0.9 \quad (4)$$

Here, N (the number of CPU cores) and SP (the benchmark value) are predetermined values determined by the product to be used. Therefore, in practice, the values of the product indexes i1 and i2 are determined as the design parameters.

The relaxation solution derivation unit 53 solves the problem formulated by the relaxation problem building unit 52 and obtains the combination of the design parameters by which the cost is made lowest when only a part of the SLOs is taken into consideration as the constraint condition. Although there is a possibility that the relaxation solution derived here cannot be achieved as the solution of the original problem and the partial problem in which all the SLOs are taken into consideration, the derived relaxation solution gives the upper limit of the evaluation value of the solution which can be achieved truly. Namely, the derived relaxation solution gives the lower limit of the cost.

Here, a method for solving the relaxation problem formulated in the above-mentioned example will be specifically described. The relaxation solution derivation unit 53 checks the specifications of the candidates x0 to x5 for the products that can be used for the web/AP server 22 in turn and calculates the minimum value of n1 which satisfies the following equation (5) obtained by transforming the above-mentioned equation (3) on the basis of the number N1 of CPU cores of each of the products x0 to x5 and a benchmark value SP1. Namely, the relaxation solution derivation unit 53 calculates the minimum required number of the web/AP servers 22.

$$n1>(\lambda \times d1)/(N1 \times SP1 \times 0.9) \quad (5)$$

For example, it is assumed that the product information 7 shown in FIG. 3 is defined and the number of servers required when each of the products x0 to x5 is used is as follows.

x0: 3, x1: 2, x2: 1, x3: 1, x4: 1, and x5: 1

Here, the combination by which the value of (the price of the product x the number of the products) is made lowest is adopted as the relaxation solution. In the first exemplary embodiment, when each of the products x0 to x5 is used, the price of the web/AP server 22 is as follows.

$$Cx0 \times 3=100 \times 3=300$$

$$Cx1 \times 2=120 \times 2=240$$

$$Cx2 \times 1=150 \times 1=150$$

$$Cx3 \times 1=250 \times 1=250$$

$$Cx4 \times 1=200 \times 1=200$$

$$Cx5 \times 1=300 \times 1=300$$

Here, Cx0 to Cx5 are the prices of the products x0 to x5, respectively.

Accordingly, the combination of "the product x2 and the number of the products is one" is selected as the relaxation solution because the price is lowest.

Similarly, the specifications of the candidates y0 to y3 for the products that can be used for the DB server 23 is checked in turn and the combination by which the value of (the price of the product x the number of the products) is made lowest is adopted as the relaxation solution.

The optimality assessment unit 54 examines whether or not the partial solution of a certain partial problem can be used as the optimal solution of the original problem by using the evaluation value of the relaxation solution derived by the relaxation solution derivation unit 53. Specifically, the optimality assessment unit 54 compares the relaxation solution (the partial relaxation solution) of each partial problem with the reference value set by the evaluation value reference setting unit 40 and eliminates the partial problem when the evaluation value of the partial relaxation solution is lower than the reference value or when the partial relaxation solution does not exist.

This uses a characteristic in which the cost for setting the optimal parameter set 60 obtained by taking into consideration all the SLOs 10 to the computer system is certainly equal to or greater than the cost for setting the parameter set derived from the relaxation solution to the computer system. Thus, by eliminating the partial problem that is not needed to solve the problem, the optimal parameter set 60 can be searched for with high efficiency and at a high speed.

For example, it is assumed a case in which the upper limit value of the cost that is specified by the customer is set as the reference value. In this case, when the cost based on a certain partial relaxation solution is higher than the reference value, the cost based on the feasible solution (the partial feasible solution) of the partial problem by which all the SLOs 10 are achieved is higher than the above-mentioned upper limit value. Therefore, it is not necessary to solve the partial problem. Further, it is assumed a case in which the cost based on the feasible solution of the original problem can be obtained and the cost is set as the above-mentioned reference value. In this case, when the cost based on the certain partial relaxation solution is higher than the reference value, the costs based on all the partial feasible solutions of the partial problem are higher than the cost based on a certain feasible solution of the original problem. Therefore, because the feasible solution of the partial problem cannot be the optimal solution of the original problem, it is not necessary to solve the partial problem.

The evaluation value comparison unit 55 solves the partial problem that is not eliminated by the optimality assessment unit 54 and regards the partial solution whose evaluation value is highest as the optimal solution of the original problem. Specifically, the evaluation value comparison unit 55 regards the parameter set by which all the specified SLOs 10 are achieved and the price is made lowest among the parameter sets included in the domain of definition of the partial problem as the solution of the partial problem.

In the first exemplary embodiment, although the method for solving the partial problem is not limited, it can be solved by for example, the so-called round-robin method in which with respect to all the parameter sets, the service levels are predicted by simulation or the like and it is determined whether or not the SLOs 10 can be achieved.

Alternatively, the optimization problem building unit 30 performs the formulation so that the predictive value of the service level monotonically increases to each design parameter, in other words, the constraint condition can be easily satisfied when the value of each control variable is high. As a result, when all the SLOs 10 are achieved when the values of all control variables are equal to the minimum value in the domain of definition, it can be determined that the search can be performed within the whole search range. For example, in the system model 20 shown in FIG. 2, when the number of the web/AP servers 22 and the number of the DB servers 23 are increased, the performance monotonically increases. Namely, the SLO 10 to define the performance such as the response time, the resource usage rate, or the like can be easily achieved. Similarly, when the candidates for the product corresponding to the product indexes of the web/AP server 22 and the DB server 23 are sorted in an order of specification, it is considered that the performance may monotonically increase to the product index. Accordingly, when the SLOs 10 are achieved when the number of the servers and the product index are equal to the minimum value in the domain of definition of the partial problem, it can be determined that all the parameter sets included in the domain of definition can be performed. Therefore, it is not necessary to check whether or not the SLO 10 can be achieved with respect to another parameter set included in the domain of definition of the partial problem.

Next, the process performed by an optimal design assistance device 100 will be described in detail with reference to FIG. 4.

First, the optimal design assistance device 100 extracts the controllable design parameter and information indicating the value that can be taken as the controllable design parameter from the system model 20 and determines the control variables in the optimization problem and the domain of definition of them. In parallel, the optimal design assistance device 100 refers to the specified SLO 10 and determines the constraint condition to be satisfied (ST101). Further, the optimal design assistance device 100 sets a predetermined evaluation reference value (ST102).

Next, the optimal design assistance device 100 divides the original problem into a plurality of partial problems by dividing the domain of definition of several control variables into some ranges (ST103). Next, with respect to each partial problem formulated in step ST103, the optimal design assistance device 100 formulates the relaxation problem with the constraint condition in which only a part of the SLOs to which it can be determined whether or not the SLO can be achieved at a high speed is included (ST104). Further, the optimal design assistance device 100 derives the relaxation solution of the relaxation problem, compares the evaluation value of the derived relaxation solution with the evaluation reference value set in step ST102 and determines whether or not the evaluation value of the relaxation solution is smaller than the evaluation reference value (ST105).

When it is determined that the evaluation value of the relaxation solution is smaller than the evaluation reference value (ST105: YES), the optimal design assistance device 100 derives the partial solution (ST106) and when it is determined that the evaluation value of the relaxation solution is equal to or greater than the evaluation reference value (ST105: NO), the optimal design assistance device 100 eliminates the partial problem (ST107). Namely, because the optimal design assistance device 100 solves only the partial problem whose evaluation value of the relaxation solution is equal to or greater than the evaluation reference value and eliminates the partial problem whose evaluation value of the relaxation solution is smaller than the evaluation reference value, the process can be performed at a high speed.

The evaluation values of the partial solution derived in step ST106 are compared with each other and the partial solution with the highest evaluation value is regarded as the solution of the original problem (ST108).

As explained above, the optimal design assistance device 100 according to the first exemplary embodiment can assist in design of system configuration with minimum cost of the computer system, even it is the computer system which performs complicated processing, so that it can be accomplished in a short time and with high efficiency.

More specifically, the optimal design assistance device 100 includes the relaxation problem building unit 52 which formulates the relaxation problem with the constraint condition in which only a part of the SLOs which can be calculated at a high speed from a plurality of the SLOs 10 defining non-functional requirements and the system model 20. Further, the optimal design assistance device 100 includes the relaxation solution derivation unit 53 which derives the relaxation solution of the relaxation problem formulated by the relaxation problem building unit 52. Further, the optimal parameter set search unit 50 compares the cost of the relaxation solution derived by the relaxation solution derivation unit 53 with the reference value of the cost set to the evaluation value reference setting unit 40. The optimal parameter set search unit 50 searches for the parameter set only when the cost based on the relaxation solution derived by the relaxation solution derivation unit 53 is equal to or smaller than the reference value of the cost set to the evaluation value reference setting unit 40 in advance. Accordingly, the optimal design assistance device 100 can efficiently search for the optimal parameter set by using the evaluation value of the solution of the relaxation problem. Further, the optimal design assistance device 100 can determine the combination of the values of the design parameters of the system model 20 by which a plurality of the specified SLOs 10 are achieved and the cost is made lowest in a short time and with high efficiency.

Second Exemplary Embodiment

Figure 5:
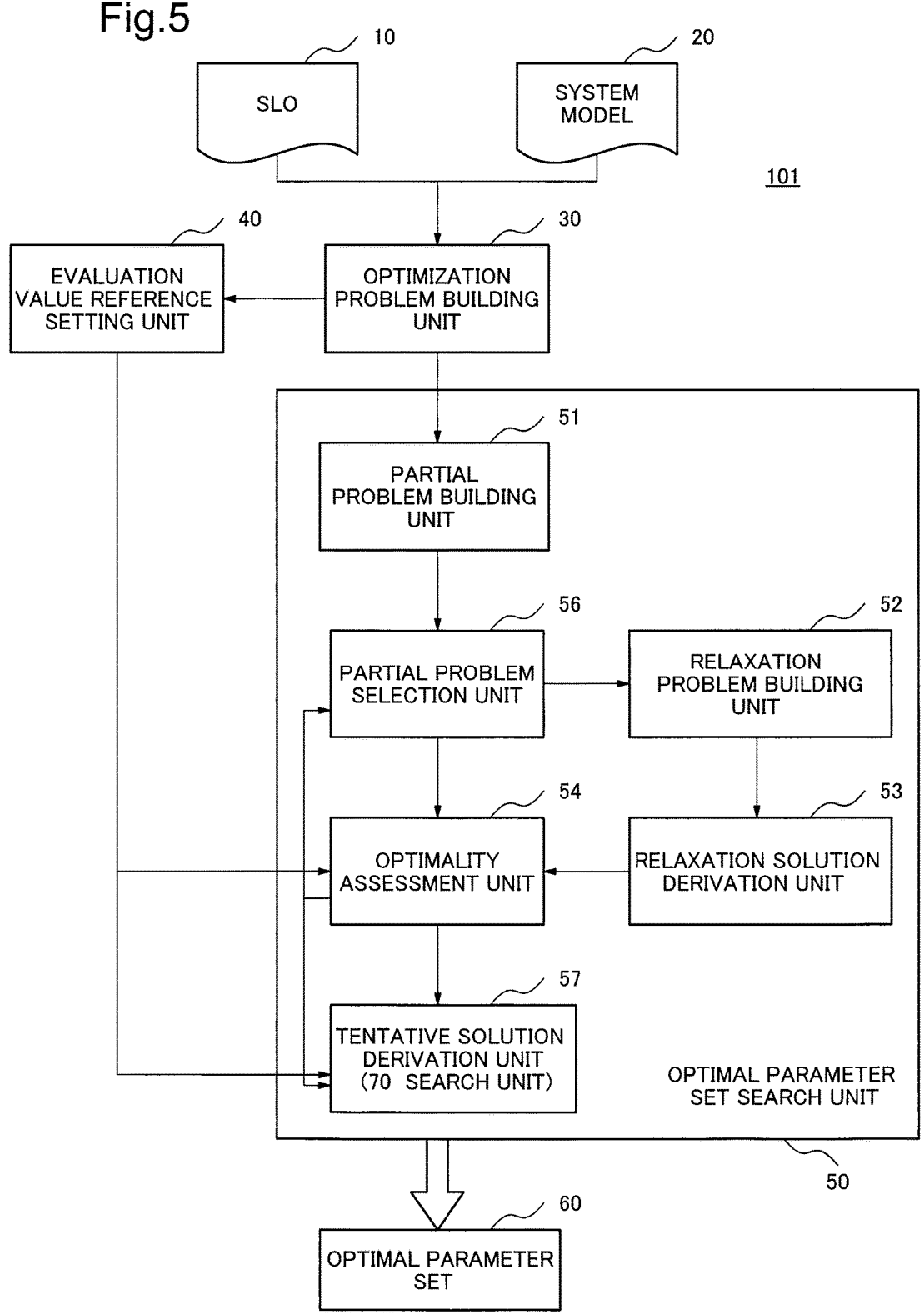
FIG. 5 is a block diagram showing a configuration of an optimal design assistance device according to a second exemplary embodiment of the present invention.

Next, a second exemplary embodiment of the present invention will be described with reference to the drawing. FIG. 5 is a block diagram showing a configuration of an optimal design assistance device 101 according to the second exemplary embodiment. When the optimal design assistance device 101 according to the second exemplary embodiment shown in FIG. 5 is compared with the optimal design assistance device 100 according to the first exemplary embodiment shown in FIG. 1, the optimal design assistance device 101 shown in FIG. 5 includes a partial problem selection unit 56 and a tentative solution derivation unit 57 (it is also called the search unit 70) instead of the evaluation value comparison unit 55. This is a difference between the optimal design assistance device 101 and the optimal design assistance device 100. Therefore, the difference from the first exemplary embodiment will be described below.

The partial problem selection unit 56 extracts the partial problem that is suitable for the formulation of the relaxation problem and the decision of optimality among a plurality of the partial problems formulated by the partial problem building unit 51.

The tentative solution derivation unit 57 solves the partial problem that is not eliminated by the optimality assessment unit 54 among the partial problems selected by the partial problem selection unit 56, compares the partial solution with the best solution among the solutions of the other partial problems that have been solved in turn, and stores the solution with higher evaluation value as a tentative solution. The tentative solution derivation unit 57 regards the tentative solution stored when all the partial problems have been solved as the optimal solution of the original problem.

In the second exemplary embodiment, the optimality assessment unit 54 determines the optimality of the partial problem by comparing the evaluation value of each partial relaxation solution with the evaluation value of the tentative solution derived by the tentative solution derivation unit 57. When the evaluation value of a certain partial relaxation solution is smaller than the evaluation value of the tentative solution or the relaxation solution does not exist, the optimality assessment unit 54 eliminates the partial problem concerned.

However, in the tentative solution derivation unit 57 and the optimality assessment unit 54, when any partial problem is not solved, the optimal design assistance device 101 performs the comparison using the reference value set by the evaluation value reference setting unit 40 like the first exemplary embodiment. "Any partial problem is not solved" means a case in which at the time of comparison between the evaluation value of each partial relaxation solution and the evaluation value of the tentative solution, the tentative solution is not obtained.

Figure 6:
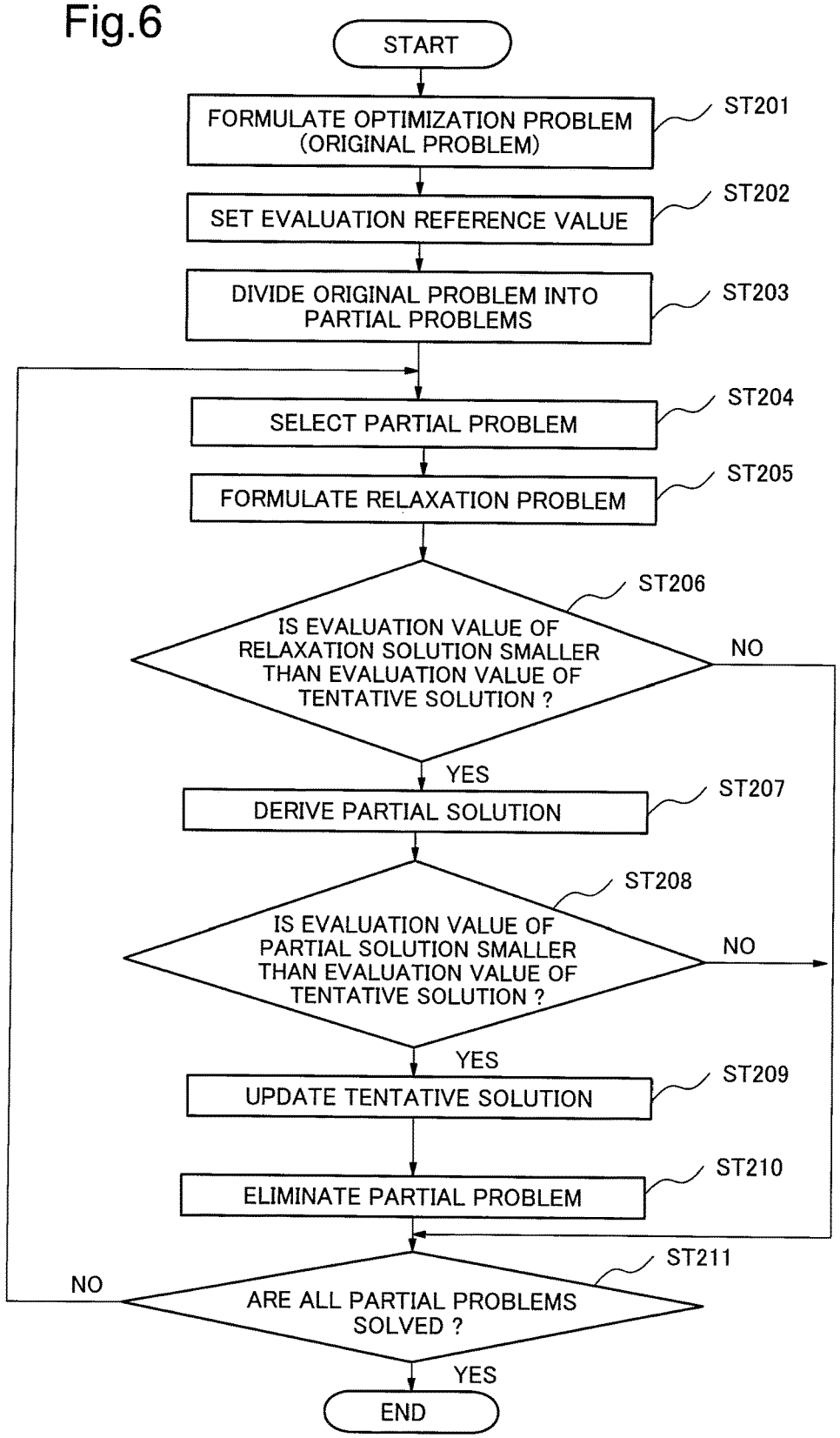
FIG. 6 is a flowchart showing a process performed by an optimal design assistance device shown in FIG. 5.

Next, the process performed by the optimal design assistance device 101 will be described in detail with reference to FIG. 6.

Figure 4:
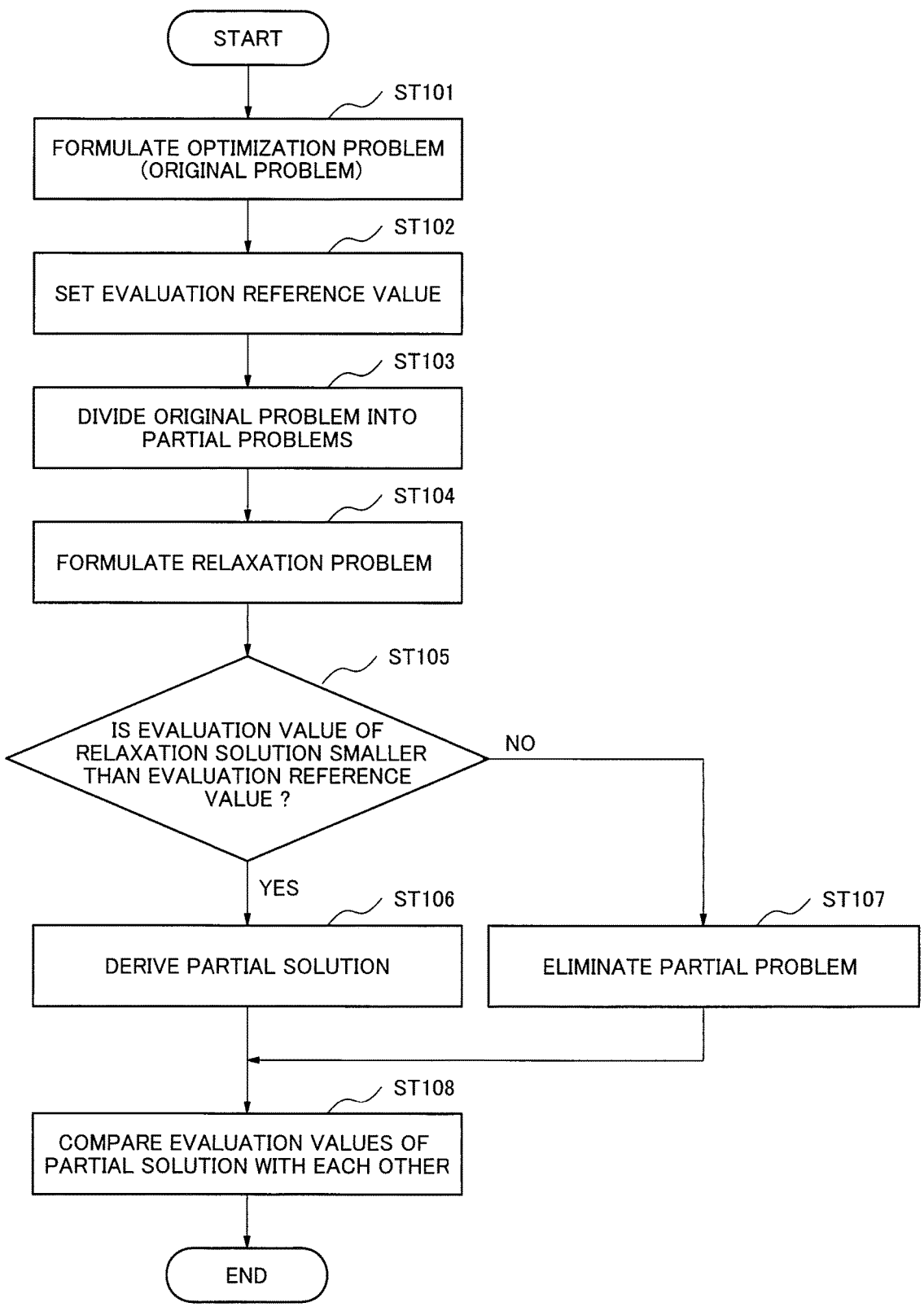
FIG. 4 is a flowchart showing a process performed by an optimal design assistance device shown in FIG. 1.

First, the processes of steps ST201 to ST203 (these processes are similar to the processes of step ST101 to ST103 of FIG. 4.) are performed and the optimal design assistance device 101 selects the partial problem to be solved among the formulated partial problems (ST204).

Next, with respect to the partial problem, the optimal design assistance device 101 formulates the relaxation problem (ST205). The optimal design assistance device 101 compares the evaluation value of the relaxation solution obtained by solving the relaxation problem with the evaluation value (here, when the tentative solution is not derived, the evaluation reference value is used) of the tentative solution, and determines whether or not the evaluation value of the relaxation solution is smaller than the evaluation value of the tentative solution (ST206).

When the optimal design assistance device 101 determines that the evaluation value of the relaxation solution is smaller than the evaluation value of the tentative solution (ST206: YES), the optimal design assistance device 101 solves the partial problem selected in step ST204 and derives the partial solution (ST207). When the optimal design assistance device 101 determines that the evaluation value of the relaxation solution is smaller than the evaluation value of the tentative solution (ST206: NO), the optimal design assistance device 101 eliminates the partial problem (ST210). Namely, when the evaluation value of the relaxation solution is greater than the evaluation value of the tentative solution, the optimal design assistance device 101 derives the partial solution and when the evaluation value of the relaxation solution is smaller than the evaluation value of the tentative solution, the optimal design assistance device 101 eliminates the partial solution.

Next, the optimal design assistance device 101 compares the evaluation value of the partial solution derived in step ST107 with the evaluation value of the tentative solution and determines whether or not the evaluation value of the partial solution is smaller than the evaluation value of the tentative solution (ST208). When the optimal design assistance device 101 determines that the evaluation value of the partial solution is not smaller than the evaluation value of the tentative solution (ST208: NO), the optimal design assistance device 101 eliminates the partial problem concerned (ST210). When the optimal design assistance device 101 determines that the evaluation value of the partial solution is smaller than the evaluation value of the tentative solution (ST208: YES), the optimal design assistance device 101 updates the tentative solution (ST209) and eliminates the partial problem concerned (ST210). Namely, when the evaluation value of the partial solution is smaller than the evaluation value of the tentative solution, the optimal design assistance device 101 eliminates the partial problem concerned and when the evaluation value of the partial solution is greater than the evaluation value of the tentative solution, the optimal design assistance device 101 replaces the tentative solution with the partial solution and then, eliminates the partial problem.

Next, the optimal design assistance device 101 determines whether or not the processes of steps ST204 to ST210 are finished for all the partial problems (ST211). When the optimal design assistance device 101 determines that the processes are not finished for all the partial problems (ST211: NO), the process goes back to step ST204 and when the optimal design assistance device 101 determines that the processes are finished (ST211: YES), the optimal design assistance device 101 ends this process. Namely, the optimal design assistance device 101 repeats the processes from step ST204 to step ST211 until all the partial problems are solved.

As described above, the optimal design assistance device 101 according to the second exemplary embodiment determines the optimality of the partial problem by comparing the evaluation value of the tentative solution with the best evaluation value derived in the process in which the partial problem is solved sequentially with the evaluation value of the relaxation solution of the partial problem that is not solved. Here, the evaluation value of the tentative solution is a cost of the system configuration which achieves all the plurality of SLOs 10 specified under a predetermined condition. For this reason, with the advance of the process of searching for the parameter set, the number of the partial problems which can be eliminated without checking whether or not the SLO 10 can be achieved increases. Accordingly, the optimal design assistance device 101 can assists in design of the combination of the design parameters of the system model 20 by which the specified SLO 10 is achieved and the cost is made lowest so that it can be accomplished in a shorter time and with higher efficiency than the optimal design assistance device 100

Third Exemplary Embodiment

Figure 7:
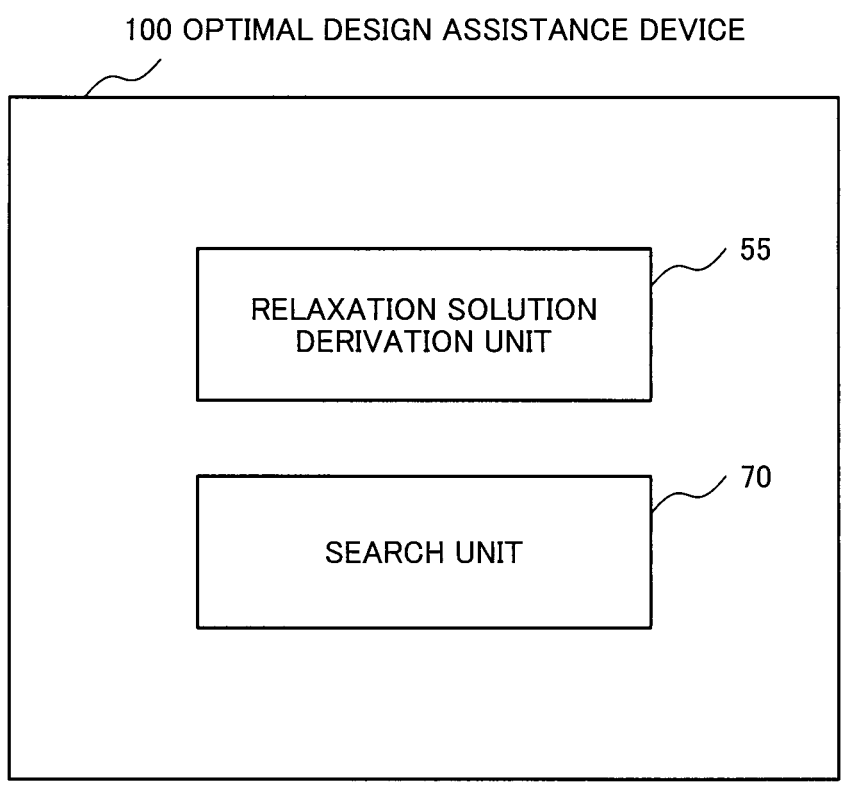
FIG. 7 is a block diagram showing a configuration of an optimal design assistance device according to a third exemplary embodiment of the present invention.

Next, a third exemplary embodiment of the present invention will be described with reference to the drawing. FIG. 7 is a block diagram showing a configuration of the optimal design assistance device 100 according to the third exemplary embodiment. The optimal design assistance device 100 according to the third exemplary embodiment is the optimal design assistance device 100 which assists in design of controllable design parameters of a computer system to which a plurality of SLOs defining non-functional requirements are specified and includes the relaxation solution derivation unit 53 and the search unit 70. The relaxation solution derivation unit 53 derives the relaxation solution evaluation value that is the minimum value of the price of the system configuration of the computer system which achieves a part of the SLOs among a plurality of the SLOs. The search unit 70 searches for the parameter set of the design parameter by which all the plurality of SLOs are achieved and the price of the system configuration is made lowest by using the relaxation solution evaluation value.

The optimal design assistance device 100 according to this exemplary embodiment can assist in design of system configuration with minimum cost of the computer system, even it is the computer system which performs complicated processing, so that it can be accomplished in a short time and with high efficiency. This is because the relaxation solution derivation unit 53 obtains the relaxation solution evaluation value and the search unit 70 searches for the parameter set of the design parameter by which all the plurality of SLOs are achieved and the price is made lowest by using the relaxation solution evaluation value.

The invention of the present application has been described above on the basis of the preferred exemplary embodiment. However, the configuration of the optimal design assistance devices 100 and 101 of the present invention is not limited to only the configuration of each exemplary embodiment described above and the exemplary embodiments to which various changes and modifications are applied are also included in the technical scope of the present invention. The present invention is not limited to the above-mentioned exemplary embodiment and various changes in the configuration can be made when the present invention is used.

This application claims priority from Japanese Patent Application No. 2012-274429, filed on Dec. 17, 2012, the disclosure of which is hereby incorporated by reference in its entirety.

REFERENCE SIGNS LIST

10 SLO (Service Level Object)
20 system model
30 optimization problem building unit
40 evaluation value reference setting unit
50 optimal parameter set search unit
51 partial problem building unit
52 relaxation problem building unit
53 relaxation solution derivation unit
54 optimality assessment unit
55 evaluation value comparison unit
56 partial problem selection unit
57 tentative solution derivation unit
70 search unit
100, 101 optimal design assistance device

What is claimed is:

1. An optimal design assistance device which assists in design of controllable design parameters of a computer system to which a plurality of Service Level Objects (SLOs) defining non-functional requirements of the computer system are specified, the optimal design assistance device comprising:
at least one memory configured to store a program and at least one processor configured to read the program to execute:
a derivation unit that derives a minimum value of a price of a system configuration of the computer system, as a relaxation solution evaluation value, by using a part of the SLOs, the relaxation value being determined at high speed without simulation;
a search unit that searches for a parameter set of design parameters using the derived minimum value of the price, which achieves all of said plurality of SLOs and minimizes the price of the system configuration; and
an optimality assessment unit that compares the relaxation solution evaluation value with the minimum value of the price of the system configuration set in advance and makes the search unit search for the parameter set when the relaxation solution evaluation value is smaller than the minimum value of the price of the system configuration set in advance.

2. The optimal design assistance according to claim 1, wherein a part of the SLOs corresponds to a resource usage rate.

3. The optimal design assistance device according to claim 1, wherein the at least one processor is further configured to read the program to execute: a building unit that derives the minimum value of the price of the system configuration to the SLO to which a predictive value cannot be calculated by a specific closed equation.

4. The optimal design assistance device according to claim 1, wherein the optimality assessment unit further compares the relaxation solution evaluation value with an evaluation value of a tentative solution that is a price in the system configuration which achieves all the plurality of specified SLOs under a predetermined condition and makes the search unit search for the parameter set when the relaxation solution evaluation value is smaller than the evaluation value of the tentative solution.

5. A non-transitory computer readable medium that stores therein a computer program when executed by an optimal design assistance device causes the optimal design assistance device to perform a method of assisting in designing controllable design parameters of a computer system to which a plurality of Service Level Objects (SLOs) defining non-functional requirements of the computer system are specified, the method comprising:
  deriving a minimum value of a price of a system configuration of the computer system, as a relaxation solution evaluation value, by using a part of the SLOs, the relaxation value being determined at high speed without simulation;
  searching for a parameter set of design parameters using the derived minimum value of the price, which achieves all of said plurality of SLOs and minimizes the price of the system configuration;
  comparing the relaxation solution evaluation value with the minimum value of the price of the system configuration set in advance; and
  searching for the parameter set when the relaxation solution evaluation value is smaller than the minimum value of the price of the system configuration set in advance.

6. A method for designing controllable design parameters of a computer system to which a plurality of Service Level Objects (SLOs) defining non-functional requirements of the computer system are specified, the method comprising:
  deriving a minimum value of a price of a system configuration of the computer system, as a relaxation solution evaluation value, by using a part of the SLOs, the relaxation value being determined at high speed without simulation;
  searching for a parameter set of design parameters using the derived minimum value of the price, which achieves all of said plurality of SLOs and minimizes the price of the system configuration;
  comparing the relaxation solution evaluation value with the minimum value of the price of the system configuration set in advance; and
  searching for the parameter set when the relaxation solution evaluation value is smaller than the minimum value of the price of the system configuration set in advance.

* * * * *